United States Patent [19]
Huang

[11] Patent Number: 6,009,749
[45] Date of Patent: Jan. 4, 2000

[54] TIRE PRESSURE GAGE

[76] Inventor: Tien-Tsai Huang, No. 4, Lane 30, Wu-Chuan St., Pan-Chiao City, Taipei Hsien, Taiwan

[21] Appl. No.: 09/007,504

[22] Filed: Jan. 15, 1998

[51] Int. Cl.[7] .................................................. G01M 13/04
[52] U.S. Cl. ............................................................ 73/146.3
[58] Field of Search ................................ 73/146.3, 146.8, 73/714, 744

[56] References Cited

U.S. PATENT DOCUMENTS 5,117,684   6/1992   Hwang ..................................... 73/146.8

*Primary Examiner*—William Oen
*Attorney, Agent, or Firm*—Fish & Richardson P.C.

[57] ABSTRACT

A tire pressure gauge includes a tubular housing, an elongated plunger extending longitudinally in the tubular housing, and a pen element inserted in an axial bore of the plunger. The tubular housing has a first end portion and a second end portion formed with an axially extending elongated guide slot that extends from a distal end face thereof. The plunger has a driven end portion to be driven by a piston in the tubular housing, and a guided end portion provided with a radial pin which is extendible outwardly of the tubular housing via the guide slot. The pen element has a writing end which extends outwardly of the bore of the plunger. The writing end is retracted into the tubular housing when the radial pin is moved in the guide slot toward the first end portion of the tubular housing, and is exposed from the tubular housing when the radial pin is moved to extend out of the guide slot. The plunger is rotatable axially relative to the tubular housing to engage the radial pin with the distal end face of the tubular housing when the radial pin is extended out of the guide slot to maintain the writing end in an exposed position.

12 Claims, 8 Drawing Sheets

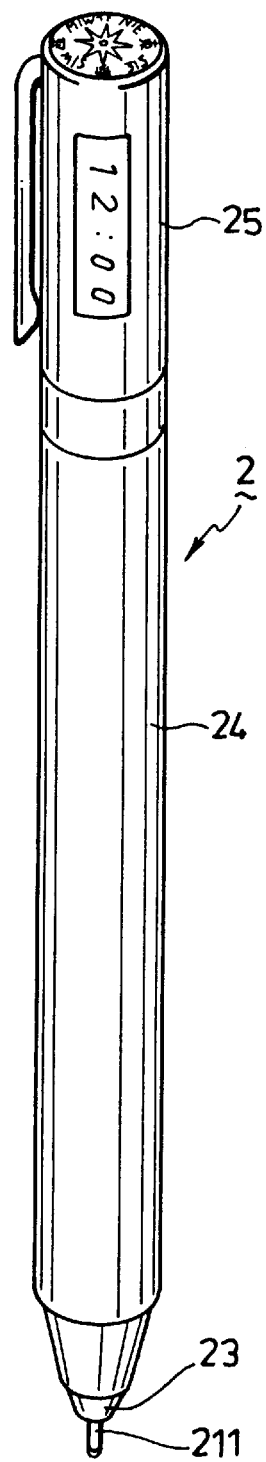
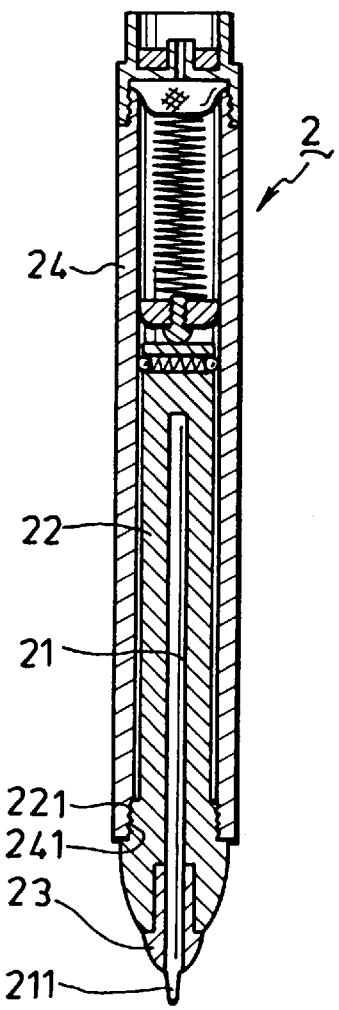
PRIOR ART
FIG.2
PRIOR ART
FIG.3

TIRE PRESSURE GAGE

BACKGROUND OF THE INVENTION

1. Field of the Invention

The present invention relates to a tire pressure gauge, more particularly to a tire pressure gauge having a retractable pen element which can be concealed within or exposed from a tubular housing.

2. Description of the Related Art

Conventional tire pressure gauges are generally provided with a pressure responsive movable indicator rod to indicate the pressure value that is detected thereby. Referring to FIG. 1, a conventional tire pressure gauge 1 comprises a tubular housing 10, a pressure measuring head 11 formed with a pressure inlet hole 11a, a piston 12 disposed movably in the tubular housing 10, a spring 13, a hollow guide 14, and a plunger or graduated pressure indicator 15. When measuring the pressure inside a tire (not shown), the pressure measuring head 11 is connected to an inflating valve (not shown) of the tire so that the gas in the tire enters the tubular housing 10 and pushes the piston 12, which in turns moves the pressure indicator 15 out of the tubular housing 10 against the biasing action of the spring 13. The pressure inside the tire is read from the graduation on the pressure indicator 15 which is aligned with a pointer, e.g., the bottom end of the hollow guide 14 or the bottom end of the tubular housing 10. After reading, the pressure indicator 15 is pushed inward manually to revert to its original position.

The tire pressure gauge 1 provides a single function of measuring the pressure inside a tire. Since a writing instrument is usually needed during measurement of the tire pressure for recording the detected pressure value, another conventional tire pressure gauge 2, which incorporates a writing instrument, has been proposed. Referring to FIGS. 2 and 3, the tire pressure gauge 2 also includes a tubular housing 24 and a plunger or graduated pressure indicating rod 22 provided in the housing 24. The pressure indicating rod 22 is formed with an axial blind bore for receiving a pen element 21. A coupling sleeve 23 is mounted on the pressure indicating rod 22 at the blind bore for coupling the pen element 21 to the pressure indicating rod 22. The pen element 21 has a writing tip 211 that extends outwardly of the coupling sleeve 23. In order to position the pen element 21 when the latter is in use, the pressure indicating rod 22 has a part formed with external screw threads 221 for engaging internal screw threads 241 on the tubular housing 24.

Although the tire pressure gauge 2 provides the combined functions of measuring the pressure inside a tire and providing a pen element for writing down the measured pressure value, the tire pressure gauge 2 suffers from the following drawbacks:

(1) Since the pressure indicating rod 22 engages threadedly the tubular housing 24, prior to using the tire pressure gauge 2 for measuring the pressure inside a tire, the pressure indicating rod 22 must be rotated to disengage the same from the tubular housing 24 so as to permit axial movement of the pressure indicating rod 22 relative to the tubular housing 24.

(2) Since a writing tip of the pen element 21 is exposed from the pressure indicating rod 22, an additional cap 25 is needed to prevent ink of the pen element 21 from fouling the user's clothes and to prevent the sharp tip 211 of the pen element 21 from piercing the user's clothes. Moreover, recapping of the pen element 21 is required after use.

SUMMARY OF THE INVENTION

The main object of the present invention is to provide a tire pressure gauge which has a retractable pen element that can be retracted into or exposed from a tubular housing, thereby obviating the need for an additional cap as required in the prior art.

Accordingly, the tire pressure gauge of the present invention includes a tubular housing, a pressuring measuring head, a piston, an elongated plunger, a hollow guide unit, a spring, and a pen element. The tubular housing has a first end portion and a second end portion formed with an axially extending elongated guide slot that extends from a distal end face thereof. The pressure measuring head is connected to the first end portion of the tubular housing, and has a pressure inlet hole communicated with the tubular housing. The piston is mounted movably inside the tubular housing adjacent to the pressure inlet hole for longitudinal movement in response to a pressure introduced through the pressure inlet hole. The plunger extends longitudinally in said tubular housing, and has a driven end portion disposed adjacent to the piston so as to be driven by the piston, and an opposite guided end portion provided with a radial pin which projects radially therefrom and which is extendible outwardly of the tubular housing via the guide slot. The guided end portion of the plunger is formed with an axial bore. The hollow guide unit is disposed in the second end portion of the tubular housing for guiding axial movement of the plunger relative to the tubular housing. The spring is mounted inside the tubular housing around the plunger between the piston and the hollow guide unit for biasing the piston toward the pressure inlet hole. The pen element is inserted in the bore of the plunger and has a writing end which extends outwardly of the bore. The writing end is retracted into the tubular housing to a retracted position when the radial pin is moved in the guide slot toward the first end portion of the tubular housing. The writing end is exposed from the tubular housing to an exposed position when the radial pin is moved to extend out of the guide slot. The plunger is rotatable axially relative to the tubular housing to engage the radial pin with the distal end face of the second end portion of the tubular housing when the radial pin is extended out of the guide slot to maintain the writing end in the exposed position.

BRIEF DESCRIPTION OF THE DRAWINGS

Other features and advantages of the present invention will become apparent in the following detailed description of the preferred embodiments with reference to the accompanying drawings, in which:

FIG. 2 is perspective view of another conventional tire pressure gauge;

FIG. 3 is a longitudinal sectional view of the conventional tire pressure gauge of FIG. 2;

DETAILED DESCRIPTION OF THE PREFERRED EMBODIMENTS

Figure 1:
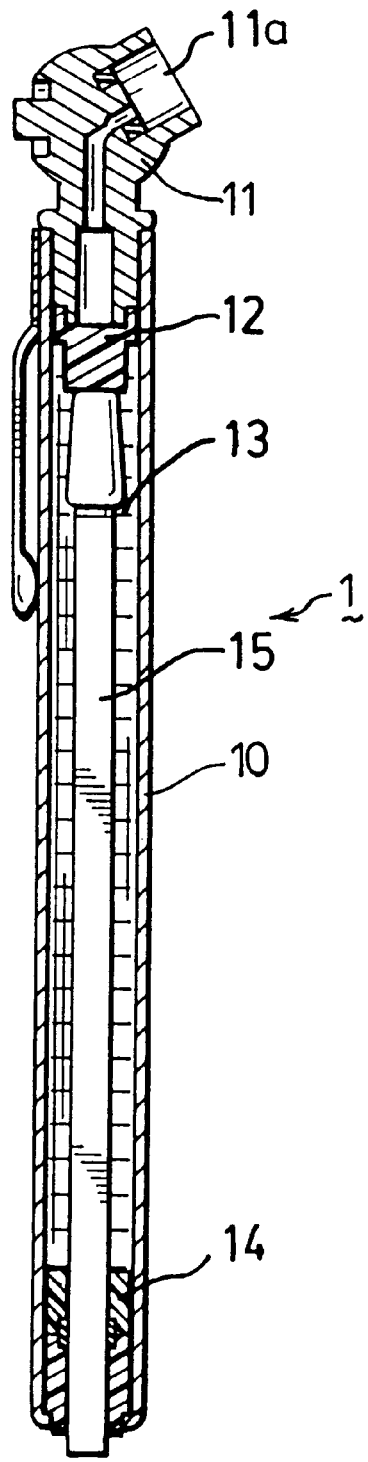
FIG. 1 is a longitudinal sectional view of a conventional tire pressure gauge.

Before the present invention is described in greater detail, it should be noted that like elements are indicated by the same reference numerals throughout the disclosure.

Figure 4:
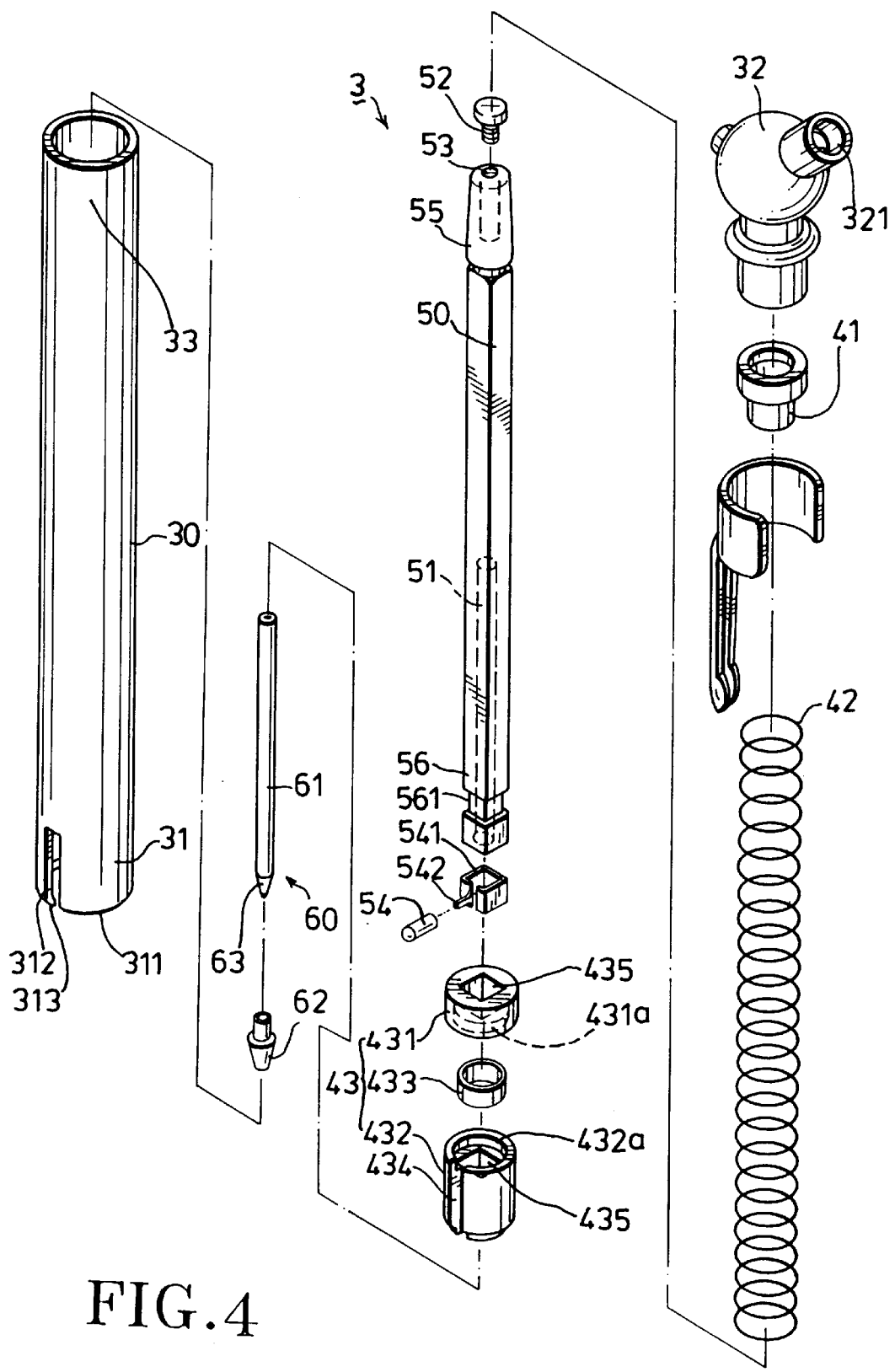
FIG. 4 is an exploded perspective view of a first preferred embodiment of a tire pressure gauge according to the present invention.

Referring to FIG. 4, the first preferred embodiment of a tire pressure gauge 3 according to the present invention is shown to include a tubular housing 30, a pressure measuring head 32, a piston 41, an elongated plunger 50, a hollow guide unit 43, a spring 42 and a pen unit 60.

The tubular housing 30 has a first end portion 33 and a second end portion 31 formed with an axially extending guide slot 312 that extends from a distal end face 311 of the second end portion 31. The distal end face 311 is formed with an inward flange 313.

The pressure measuring head 32 is connected to the first end portion 33 of the tubular housing 30, and is formed with a pressure inlet hole 321 communicated with an interior of the tubular housing 30.

The piston 41 is mounted movably inside the tubular housing 30 adjacent to the pressure inlet hole 321 for longitudinal movement in response to a pressure introduced through the pressure inlet hole 321.

The elongated plunger 50 has a rectangular cross-section and is provided with graduation marks (not shown) on its outer surface. The elongated plunger 50 extends longitudinally in the tubular housing 30, and has a driven end portion 55 and an opposite guided end portion 56. The driven end portion 55 is formed with an axial threaded hole 53 for mounting of an adjustable extension member 52 thereon. In this embodiment, the adjustable extension member 52 is formed as a headed screw with a threaded shank portion that extends threadedly into the threaded hole 53 for adjusting the total length of the extension member 52 and the plunger 50. The driven end portion 55 of the plunger 50 is disposed adjacent to the piston 41 so as to be driven by the piston 41. The plunger 50 has a guided end portion 56 formed with a peripheral groove 561. A metal piece 541 has a rectangular cross-section, and is formed by bending a metal plate. The metal piece 541 is mounted fittingly on the plunger 50 in the peripheral groove 561, and has a projection 542 with a radial pin 54 mounted thereon. The radial pin 54 is extendible outwardly of the tubular housing 30 via the guiding slot 312. The guided end portion 56 of the plunger 50 is further formed with an axial blind bore 51.

The hollow guide unit 43 includes first and second guide members 431, 432 that confine a rectangular guide hole 435 conforming with the rectangular cross-section of the plunger 50, and a friction ring 433 disposed between the first and second guide members 431, 432. The first and second guide members 431, 432 are formed with complementary annular grooves 431a, 432a for cooperatively receiving the friction ring 433. The hollow guide unit 43 is disposed in the second end portion 31 of the tubular housing 30, and is retained therein by the inward flange 313 formed on the distal end face 311 of the tubular housing 30. The second guide member 432 is formed with an axially extending slot 434 which extends between opposite end faces thereof and which is registered with the radial pin 54 provided on the plunger 50.

The spring 42 is mounted inside the tubular housing 30 around the plunger 50 between the piston 41 and the hollow guide unit 43 to bias the piston 41 toward the pressure inlet hole 321.

The pen unit 60 includes a slender pen element 61 and a positioning seat 62. The pen element 61 is inserted in the blind bore 51 of the plunger 50, and has a writing end 63 that extends outwardly of the blind bore 51. The positioning seat 62 is mounted on the plunger 50 at the open end of the blind bore 51, and has the writing end 63 extending therethrough. The positioning seat 62 couples the writing end 63 of the pen element 60 to the guided end portion 56 of the plunger 50 to prevent undesired removal of the pen element 61 from the plunger 50.

Figure 5:
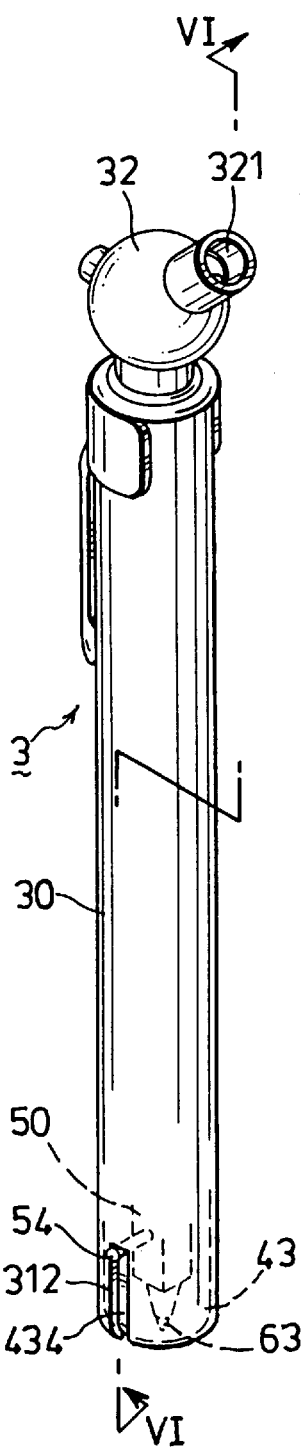
FIG. 5 is a perspective view of the first preferred embodiment, in which a writing end of a pen element is retracted into a tubular housing.
Figure 6:
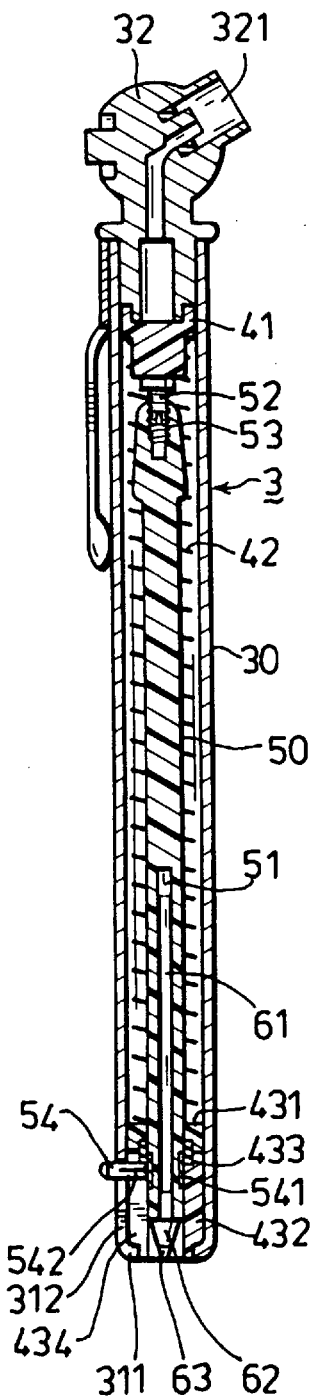
FIG. 6 is a sectional view of the first preferred embodiment, taken along line VI—VI in FIG. 5.

As shown in FIGS. 5 and 6, when the tire pressure gauge 3 is not in use, the writing end 63 of the pen element 61 is retracted into the tubular housing 30. The friction ring 433 of the hollow guide unit 43 frictionally engages the plunger 50 in the tubular housing 30 so that the plunger 50 and the writing end 63 of the pen element 61 will not be exposed undesirably from the tubular housing 30 when the tire pressure gauge 3 is carried by the user. At this time, the radial pin 54 is disposed at an innermost end of the guide slot 312 opposite to the distal end face 311.

Figure 7:
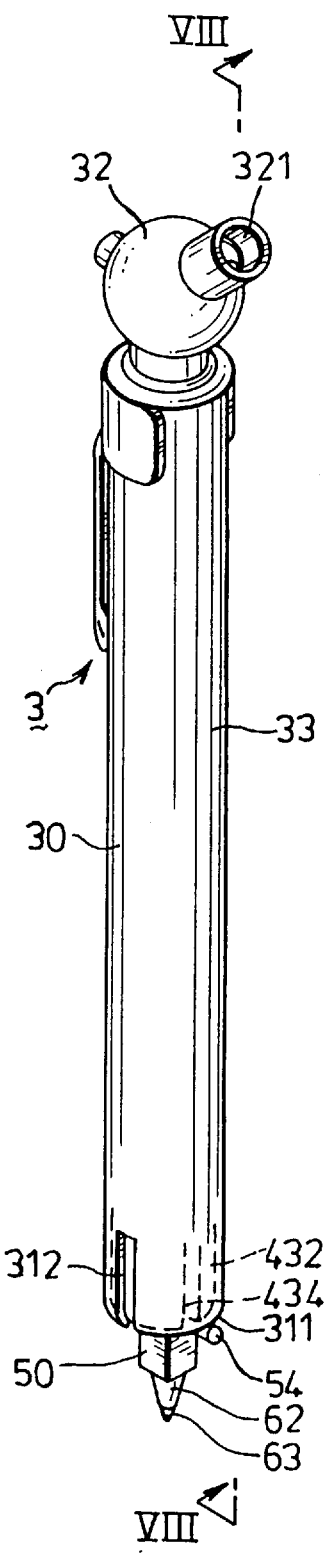
FIG. 7 is another perspective view of the first preferred embodiment, in which the writing end of the pen element is exposed from the tubular housing.
Figure 8:
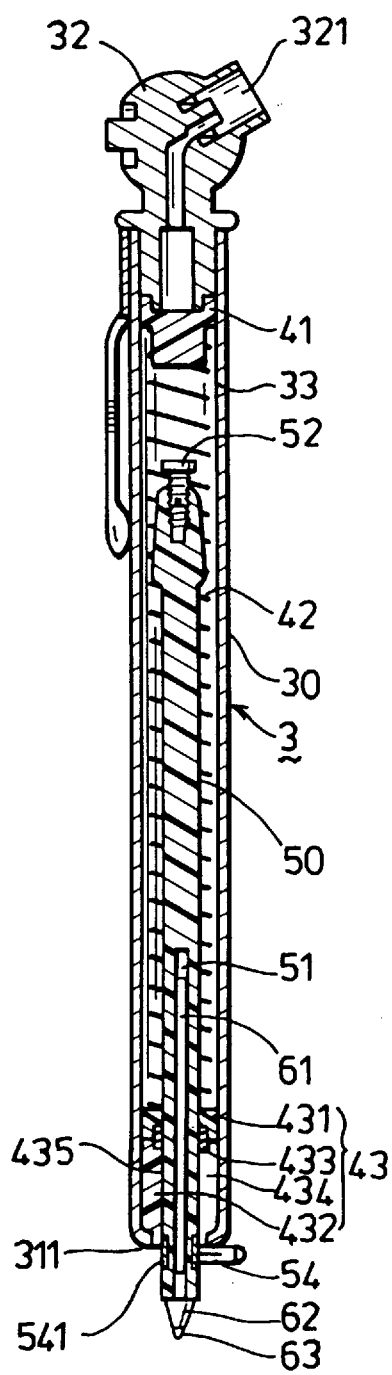
FIG. 8 is another sectional view of the first preferred embodiment, taken along line VIII—VIII in FIG. 7.

Referring to FIGS. 7 and 8, when it is desired to use the pen element 61, the radial pin 54 is moved along the guide slot 312 in a direction away from the first end portion 33 of the tubular housing 30 to extend out of the guide slot 312. The plunger 50 is then rotated axially relative to the tubular housing 30 by moving the radial pin 54 to abut against and thus engage the distal end face 311 so as to maintain the writing end 63 in the exposed position. Since the hollow guide unit 43 has a rectangular guide hole 435, the first and second guide members 431, 432 rotate together with the plunger 50 so that the axially extending slot 434 of the second guide member 432 is always aligned with the radial pin 54 even after the radial pin 54 has been extended out of the slots 312, 434.

When retracting the writing end 63 of the pen element 61 into the tubular housing 30 after use, the plunger 50 is rotated axially to align the radial pin 54 with the guide slot 312 and to simultaneously align the axially extending slot 434 of the hollow guide unit 43 with the guide slot 312. The radial pin 54 is then moved axially in the guide slot 312 toward the first end portion 33 of the tubular housing 30 to result in retraction of the writing end 63 of the pen element 61 into the tubular housing 30, as shown in FIGS. 5 and 6.

Figure 9:
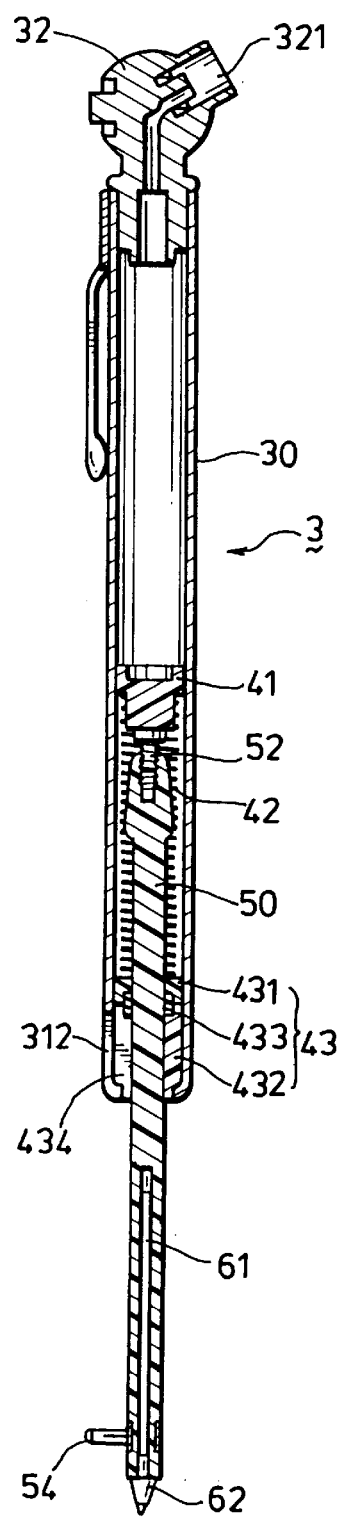
FIG. 9 is still another sectional view of the first preferred embodiment when used for measuring the pressure inside a tire.

Referring to FIG. 9, when the tire pressure gauge 3 is used for measuring the pressure inside a tire, the pressure measuring head 32 is connected to an inflating valve (not shown) of the tire so that the gas in the tire enters the tubular housing 30 and pushes the piston 41, which in turn moves the plunger 50 out of the tubular housing 30 against the biasing action of the spring 42. The friction ring 433 of the hollow guide unit 43 frictionally engages the plunger 50 to permit reading of the measured pressure value from the graduation marks on the plunger 50.

Figure 10:
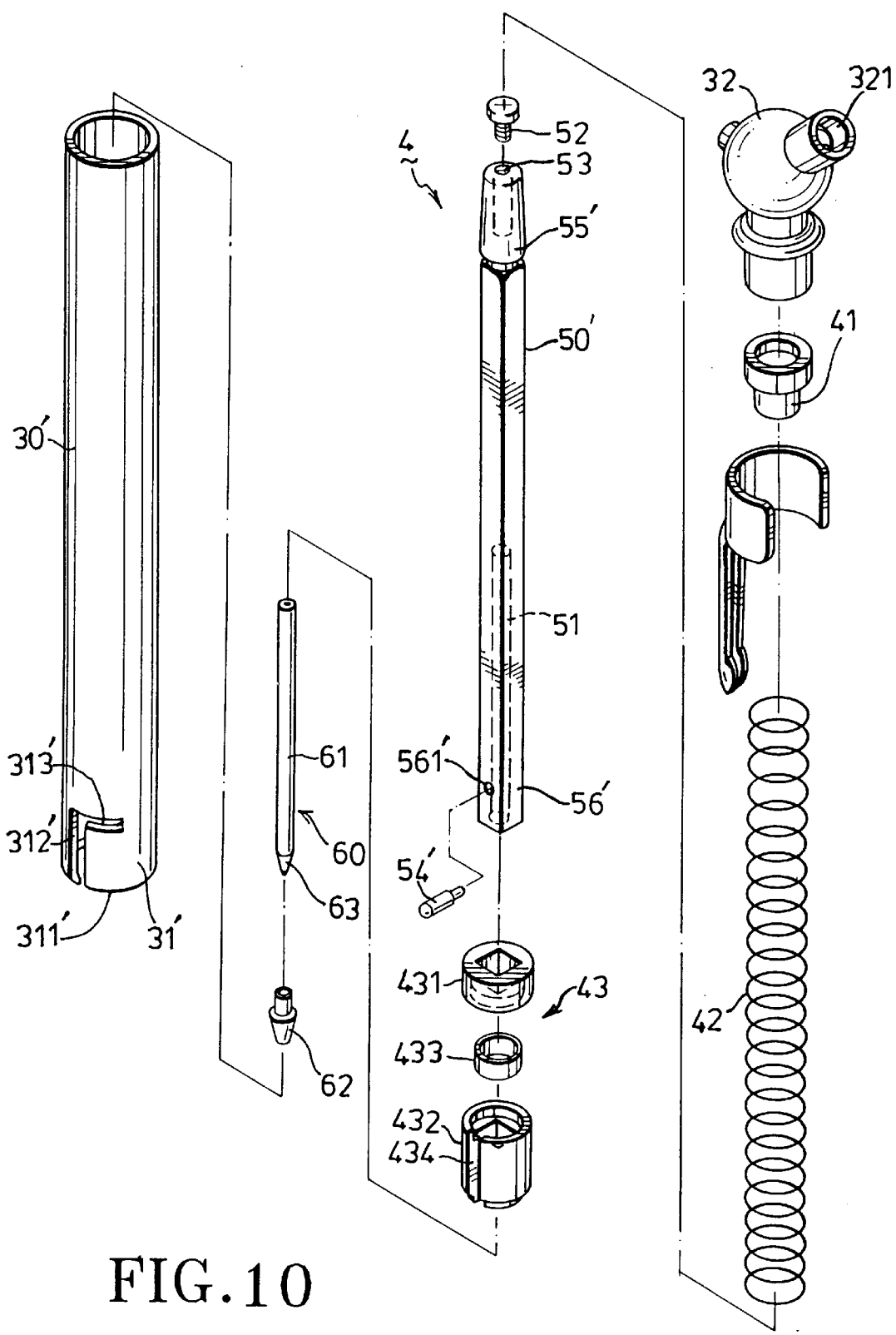
FIG. 10 is an exploded perspective view of a second preferred embodiment of a tire pressure gauge according to the present invention.
Figure 11:
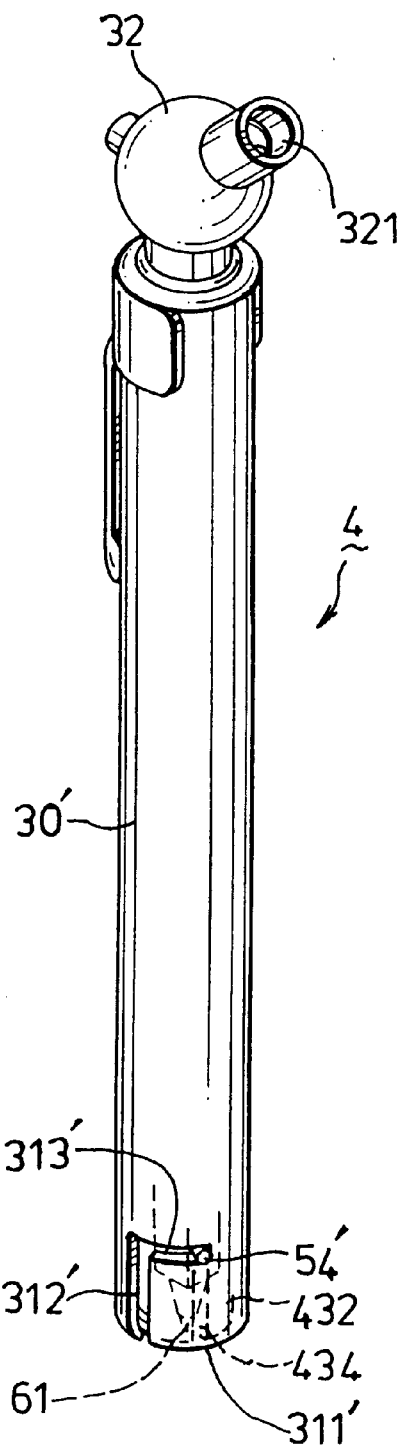
FIG. 11 is a perspective view of the second preferred embodiment, in which a writing end of a pen element is retracted into a tubular housing.

Referring to FIGS. 10 and 11, the tire pressure gauge 4 of the second preferred embodiment differs from the first preferred embodiment in the following: The guided end portion 56' of the elongated plunger 50' is formed with a radial pin hole 561'. A radial pin 54' has one end fittingly received in the pin hole 561' by means of threaded engagement or by the use of an adhesive. The second end portion 31' of the tubular housing 30' further has a circumferentially extending retaining slot 313' which extends from one end of the guide slot 312' opposite to the distal end face 311' of the second end portion 31' of the tubular housing 30'. The retaining slot 313' permits extension of the radial pin 54' thereinto for maintaining the writing end 63 of the pen element 61 in the retracted position relative to the tubular housing 30'. Undesired exposure of the writing end 63 from the tubular housing 30' due to shaking or dropping of the tire pressure gauge 4 can therefore be prevented.

Figure 12:
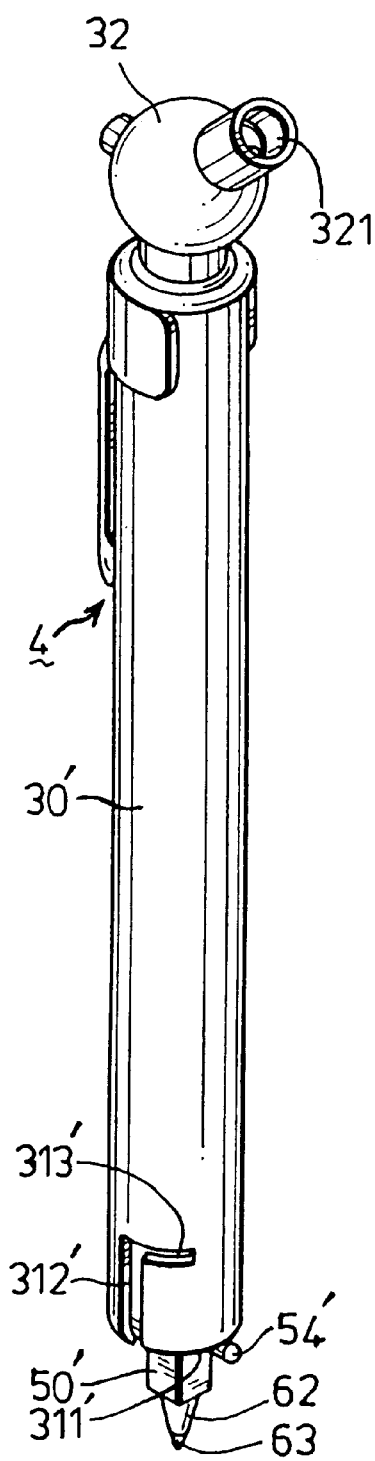
FIG. 12 is another perspective view of the second preferred embodiment, in which the writing end of the pen element is exposed from the tubular housing.

Referring to FIGS. 11 and 12, to use the pen element 61 of the tire pressure gauge 4, the radial pin 54' is moved along the retaining slot 313' and then along the guide slot 312' to extend out of the guide slot 312' so as to expose the writing end 63. After the radial pin 54' has been extended out of the guide slot 312', the radial pin 54' is moved in a manner similar to that in the previous embodiment to result in axial rotation of the plunger 50' relative to the tubular housing 30'. The radial pin 54' can thus engage the distal end face 311' of the tubular housing 30' for using the pen element 61.

It is noted that when the radial pin 54' extends into the retaining slot 313' as shown in FIG. 11, the tire pressure gauge 4 is not operable for measuring the pressure inside a tire since the plunger 50' is prevented from axial movement relative to the tubular housing 30'. The radial pin 54' must be moved to extend out of the retaining slot 313' in order to permit measuring of the pressure inside the tire.

Referring to FIGS. 4 and 10, in each of the illustrated embodiments, the adjustable extension member 52 mounted on the driven end portion 55, 55' of the plunger 50, 50' permits adjustment and correction of the total length of the extension member 52 and the plunger 50, 50' according to the characteristics of the spring 42 for maintaining the precision of the tire pressure gauge 4, 5. As such, a wider tolerance range for the quality of the spring 42 when manufacturing the tire pressure gauge 4, 5 is allowed. The cost of manufacturing can thus be reduced.

It has thus been shown that the tire pressure gauge of the present invention is convenient to operate. In addition, by making the writing end 63 of the pen element 61 retractable into the tubular housing 30, 30', an additional cap is not required.

With this invention thus explained, it is apparent that numerous modifications and variations can be made without departing from the scope and spirit of this invention. It is therefore intended that this invention be limited only as indicated in the appended claims.

I claim:

1. A tire pressure gauge comprising:
   a tubular housing having a first end portion and a second end portion formed with an axially extending elongated guide slot that extends from a distal end face thereof;
   a pressure measuring head connected to said first end portion of said tubular housing and having a pressure inlet hole communicated with said tubular housing:
   a piston mounted movably inside said tubular housing adjacent to said pressure inlet hole for longitudinal movement in response to a pressure introduced through said pressure inlet hole;
   an elongated plunger extending longitudinally in said tubular housing and having a driven end portion disposed adjacent to said piston so as to be driven by said piston, and an opposite guided end portion provided with a radial pin which projects radially therefrom and which is extendible outwardly of said tubular housing via said guide slot, said guided end portion of said plunger being formed with an axial bore;
   a hollow guide unit disposed in said second end portion of said tubular housing for guiding axial movement of said plunger relative to said tubular housing;
   a spring mounted inside said tubular housing around said plunger between said piston and said hollow guide unit for biasing said piston toward said pressure inlet hole; and
   a pen element inserted in said bore of said plunger and having a writing end which extends outwardly of said bore;
   said writing end being retracted into said tubular housing to a retracted position when said radial pin is moved in said guide slot toward said first end portion of said tubular housing, said writing end being exposed from said tubular housing to an exposed position when said radial pin is moved to extend out of said guide slot, said plunger being rotatable axially relative to said tubular housing to engage said radial pin with said distal end face of said second end portion of said tubular housing when said radial pin is extended out of said guide slot to maintain said writing end in the exposed position.

2. The tire pressure gauge according to claim 1, wherein said hollow guide unit is formed with an axially extending slot that is registered with said radial pin of said plunger to permit extension of said radial pin therethrough.

3. The tire pressure gauge according to claim 2, wherein said hollow guide unit includes a friction ring which is in friction contact with said plunger to prevent undesired axial movement of said plunger in said tubular housing.

4. The tire pressure gauge according to claim 3, wherein said plunger has a rectangular cross-section, said hollow guide unit having a guide hole which conforms with the cross-section of said plunger so that said hollow guide unit is rotatable together with said plunger to maintain alignment between said slot of said guide unit and said radial pin of said plunger.

5. The tire pressure gauge according to claim 4, wherein said guided end portion of said plunger has a peripheral groove, said tire pressure gauge further including a hollow metal piece which is mounted fittingly on said plunger in said peripheral groove and which is formed from a bent metal plate, said metal piece having a radial projection, said radial pin being mounted on said radial projection.

6. The tire pressure gauge according to claim 4, wherein said hollow guide unit further includes first and second guide members that are disposed around said plunger and that confine said guide hole, said first and second guide members being formed with complementary annular grooves that receive said friction ring therebetween.

7. The tire pressure gauge according to claim 1, wherein said second end portion of said tubular housing further has a circumferentially extending retaining slot which extends from one end of said guide slot opposite to said distal end face of said second end portion of said tubular housing, said retaining slot permitting extension of said radial pin thereinto for maintaining said writing end of said pen element in the retracted position.

8. The tire pressure gauge according to claim 1, further comprising a positioning seat that couples said writing end of said pen element to said second end portion of said plunger to prevent undesired removal of said pen element from said plunger.

9. The tire pressure gauge according to claim 1, further comprising an adjustable extension member mounted on said driven end portion of said plunger for adjusting and correcting total length of said extension member and said plunger according to characteristics of said spring.

10. The tire pressure gauge according to claim 9, wherein said extension member includes a headed screw member mounted threadedly on said driven end portion of said plunger.

11. The tire pressure gauge according to claim 1, wherein said plunger is formed with a radial pin hole having one end of said radial pin fitted therein.

12. The tire pressure gauge according to claim 1, wherein said bore in said guided end portion of said plunger is a blind bore.

* * * * *